April 11, 1939.　　I. VON K. HOTT　　2,153,891
AUTOMOBILE LIFT
Filed June 28, 1937　　2 Sheets-Sheet 1

INVENTOR.
ION V. K. HOTT
by
his ATTORNEY.

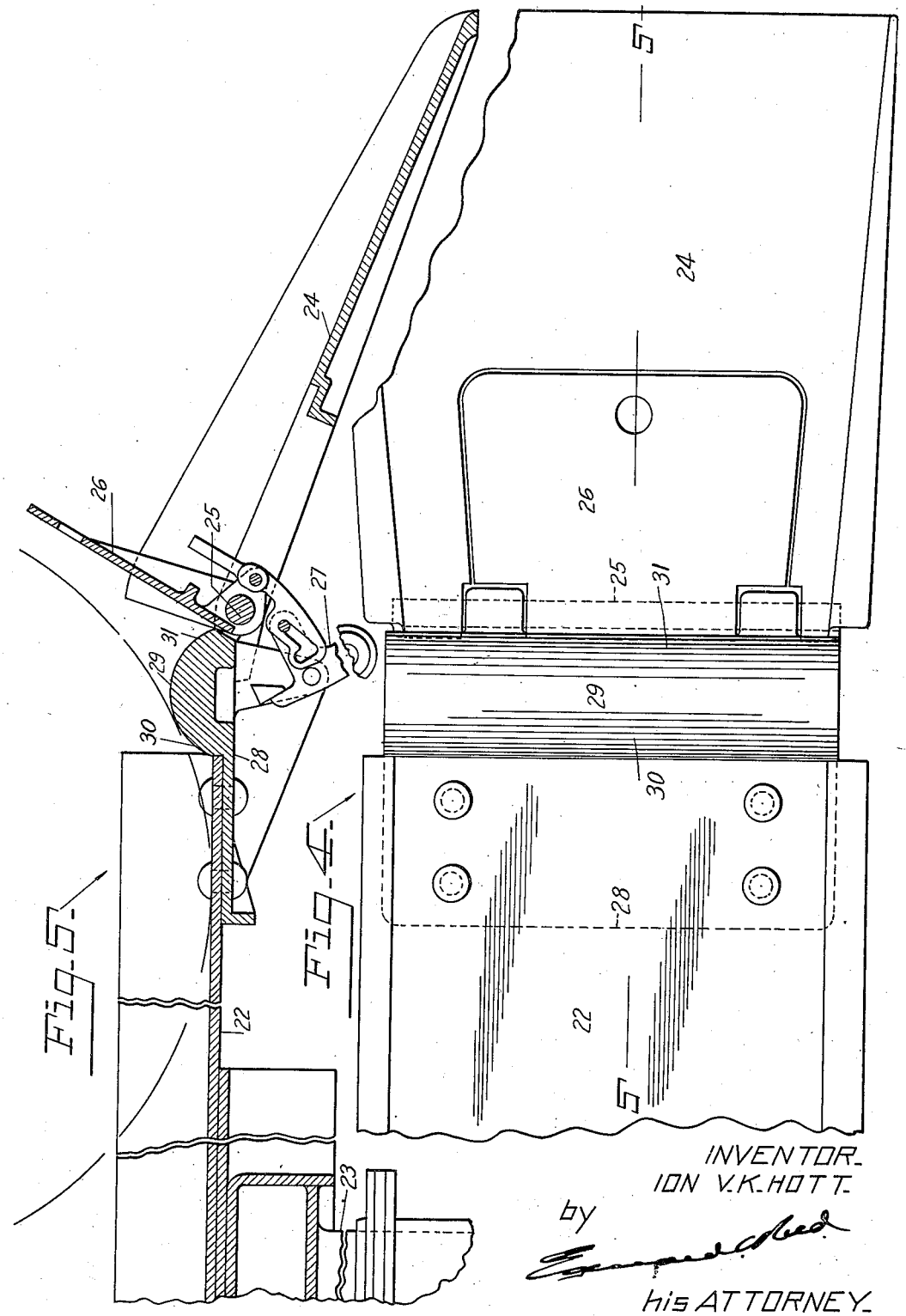

Patented Apr. 11, 1939

2,153,891

UNITED STATES PATENT OFFICE 2,153,891

AUTOMOBILE LIFT

Ion Von Kert Hott, Dayton, Ohio, assignor to The Joyce-Gridland Company, Dayton, Ohio, a corporation of Ohio Application June 28, 1937, Serial No. 150,774

1 Claim. (Cl. 254—89)

This invention relates to automobile lifts and more particularly to lifts of the type embodying runways on which the automobile is driven. In lifts of the runway type the runways are usually provided at their ends with ramps to facilitate the driving of the vehicle onto the runways and with stop devices to prevent the vehicle from running off the runways while the latter is in its elevated position. Ordinarily the stop devices are combined with the ramps which are so constructed that the ramp, either as a whole or in part, can be moved to and locked in an elevated position in which it projects above the runway. When the automobile is driven onto the runways it is sometimes stopped with the rear wheels so near the end of the runways that they will obstruct the movement of the stop devices and prevent the latter from being moved to their locked positions. Further, even if the wheels are driven onto the runways far enough to avoid obstructing the stop devices they will sometimes, due to the sagging of the runways or otherwise, slip or roll rearwardly to positions in which they will obstruct the stop devices and if the operator is tardy in moving his stop devices to their operative positions the wheels may move off the end of the runways with disastrous results.

One object of the present invention is to provide a runway with means which will prevent the wheels of the automobile from being stopped in and remaining in positions which would obstruct the movement of the stop devices to their locked positions.

A further object of the invention is to provide such a device which will prevent the movement of the wheels into positions to obstruct the stop devices after the wheels have been fully driven onto the runways.

A further object of the invention is to provide such a device which will be of a simple inexpensive construction and will in no way interfere with the normal operation of the lift or of the stop devices.

Other objects of the invention will appear as the device is described in detail.

Figure 1:
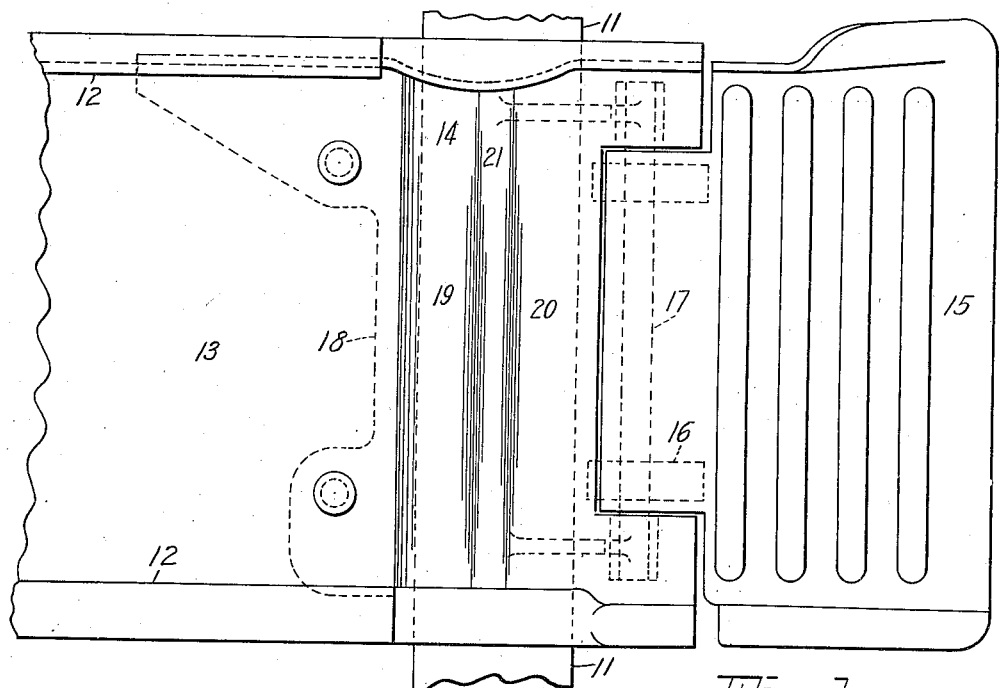
Figure 3:
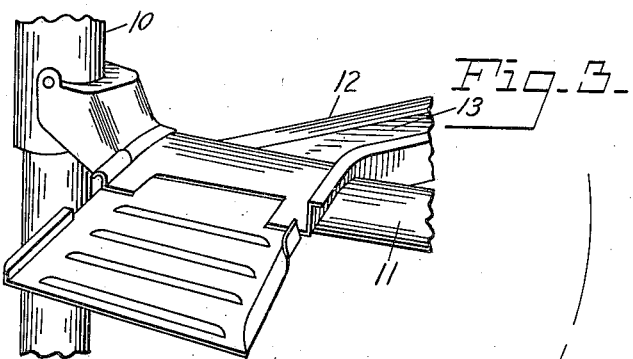
Figure 2:
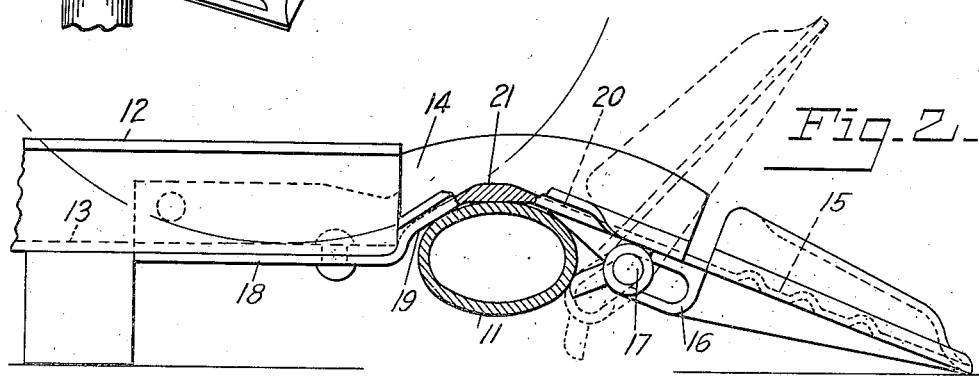

In the accompanying drawings Fig. 1 is a plan view of the end portion of one of the runways of an automobile lift showing the invention applied thereto; Fig. 2 is a side elevation of the end of the runway, as shown in Fig. 1; Fig. 3 is a perspective view of a portion of a runway embodying the invention; Fig. 4 is a plan view of a portion of the runway showing the invention applied thereto in a modified form; and Fig. 5 is a longitudinal sectional view taken on the line 5—5 of Fig. 4.

In these drawings I have shown two embodiments of the invention as applied to different types of automobile lift but it will be understood that these particular embodiments have been chosen for the purpose of illustration only and that the invention may take various forms and may be applied to automobile lifts of various kinds.

In Figs. 1, 2 and 3 I have shown the invention as applied to one of the runways of a four post lift. A four post lift usually comprises four upright posts, one of which is shown at 10 in Fig. 3, arranged in rectangular formation, and cross bars 11 extending between the posts at the respective ends of the lift and mounted on those posts for movement vertically thereof. The runways 12 are supported at their ends on the respective cross bars. In the drawings I have illustrated the end portion of one runway only but it will be understood that the invention may be applied to one or both ends of either or both of the runways. In the particular arrangement here shown the runway comprises a main or track portion 13 to the end of which is secured a connecting member 14 which extends across the cross bar 11 and supports the end of the runway on that cross bar. A ramp 15 is attached to the connecting member 14 on that side of the cross bar opposite the track portion of the runway and in the present instance this ramp is movable into an elevated position to serve as a stop to prevent the automobile from running off the runway. For this purpose it is provided with slotted lugs 16 which are mounted on a shaft 17 carried by the connecting member. When the ramp is moved from its normal position to its elevated position it moves transversely with relation to the shaft 17 so that the lugs 16 will engage the cross bar 11 and thus lock the ramp in its elevated position. To prevent the wheels of the automobile from stopping on the runways in such positions as to prevent the ramp being moved to and locked in its elevated position I have provided the runway with an elevated portion or hump having a relatively narrow top surface which will be insufficient to support the automobile wheels. Consequently if the automobile is stopped with the wheels supported on the hump these wheels will tend to move by gravity either forwardly onto the track portion of the runway or rearwardly onto the ramp. If they move forwardly they do not obstruct the movement of the ramp into its elevated position. If they move rearwardly they will either stop on the ramp or move entirely beyond the ramp onto the pavement and in either event the lift will not be elevated until the automobile has been moved to its correct position. In the arrangement shown the connecting member has on the inner or forward side of the cross bar a part 18 to which the adjacent end of the track portion of the runway is rigidly secured and this portion 18 of the connecting member is spaced a substantial distance below the horizontal plane of the top of the cross bar 11. The tread surface of the connecting member extends from the part 18 thereof upwardly and rearwardly across the cross bar and then downwardly and rearwardly toward the ramp 15, thus providing the same with an upwardly and rearwardly inclined portion 19 and a downwardly and rearwardly inclined portion 20. These inclined portions are connected at their upper end by a relatively narrow top portion 21. This raised portion or hump of the connecting member may take any desired shape which will accomplish the desired result and may be formed on the runway in any suitable manner.

In Figs. 4 and 5 of the drawings I have shown the invention as applied to one of the runways of a lift in which the runways 22 are carried by a central supporting member or ram 23. In this construction also the runway is provided at its ends with combined ramp and stop device and in the present instance the stop device operates automatically. The ramp as a whole, as indicated at 24, is mounted on a shaft 25 and a plate 26, which normally forms a part of the tread surface of the ramp, is pivotally mounted on the shaft 25 for movement into an upwardly extending position. This movable plate 25 is connected with and automatically controlled by a weighted lever 27. The means for automatically controlling the stop device form no part of the present invention but are fully illustrated and described in Patent No. 1,955,586, granted to me April 17, 1934. The combined ramp and stop device are connected with the runway 22 by means of a connecting member 28 which is rigidly secured to the adjacent end of the track portion of the runway and on which the shaft 25 is mounted. This connecting member is provided with an elevated portion or hump arranged in the path of a wheel moving onto the runway and in the particular construction here illustrated the connecting member 28 is in the form of a casting and the raised portion or hump 29 is formed integral therewith. In this form of the device the hump is also provided with front and rear inclined surfaces 30 and 31 connected at their upper edges by a narrow curved top surface so that if a wheel is stopped on the top of the hump it will tend to move by gravity down one or the other of the inclined surfaces, and after the wheel has once moved beyond the hump the latter will prevent it from sliding rearwardly far enough to obstruct the movement of the stop device 26 to its locked position, even though the runways may sag under the weight of the load.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

In an automobile lift, a substantially flat runway having an elevated portion adjacent to but spaced from one end thereof, said elevated portion having front and rear surfaces sloping downwardly toward the adjacent end and the inner portion, respectively, of said runway and having a relatively narrow top surface, and an inclined ramp mounted on said runway with its upper end arranged normally at the lower end of the front surface of said elevated portion of the runway and having a part movable to an elevated position to form a stop at said end of said runway, the arrangement of said elevated portion of said runway being such that a wheel supported on the narrow top surface thereof will move by gravity down one or the other of said sloping surfaces.

ION VON KERT HOTT.

CERTIFICATE OF CORRECTION.

Patent No. 2,153,891. April 11, 1939.

ION VON KERT HOTT.

It is hereby certified that the name of the assignee in the above numbered patent was erroneously described and specified as "The Joyce-Gridland Company" whereas said name should have been described and specified as The Joyce-Cridland Company, of Dayton, Ohio, a corporation of Ohio, as shown by the record of assignments in this office; and that the said Letters Patent should be read with this correction therein that the same may conform to the record of the case in the Patent Office.

Signed and sealed this 16th day of May, A. D. 1939.

Henry Van Arsdale (Seal) Acting Commissioner of Patents.